(12) United States Patent
Tiecke et al.

(10) Patent No.: US 10,504,007 B2
(45) Date of Patent: Dec. 10, 2019

(54) DETERMINATION OF POPULATION DENSITY USING CONVOLUTED NEURAL NETWORKS

(71) Applicant: Facebook, Inc., Menlo Park, CA (US)

(72) Inventors: Tobias Gerard Tiecke, Menlo Park, CA (US); Amy Zhang, San Francisco, CA (US); Xianming Liu, Menlo Park, CA (US); Andreas Gros, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 97 days.

(21) Appl. No.: 15/795,741

(22) Filed: Oct. 27, 2017

(65) Prior Publication Data

US 2019/0130224 A1    May 2, 2019

(51) Int. Cl.
| | |
|---|---|
| *G06K 9/00* | (2006.01) |
| *G06K 9/62* | (2006.01) |
| *G06N 3/08* | (2006.01) |
| *G06K 9/46* | (2006.01) |
| *G06K 9/40* | (2006.01) |
| *G06N 3/04* | (2006.01) |

(52) U.S. Cl.
CPC ............ *G06K 9/6268* (2013.01); *G06K 9/40* (2013.01); *G06K 9/46* (2013.01); *G06K 9/4628* (2013.01); *G06K 9/6259* (2013.01); *G06K 9/6273* (2013.01); *G06N 3/0454* (2013.01); *G06N 3/08* (2013.01); *G06N 3/084* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,856,696 | B1 * | 2/2005 | Ajioka | G06K 9/0014 382/103 |
| 2003/0007674 | A1 * | 1/2003 | Tsujii | G06T 7/0012 382/132 |
| 2010/0092043 | A1 * | 4/2010 | Borman | G06T 7/20 382/107 |
| 2016/0379371 | A1 * | 12/2016 | Chen | G06K 9/4604 382/173 |

\* cited by examiner

*Primary Examiner* — Alex Kok S Liew
(74) *Attorney, Agent, or Firm* — Baker Botts L.L.P.

(57) ABSTRACT

In one embodiment, a method includes receiving an image on a computing device. The computing device may further execute a weakly-supervised classification algorithm to determine whether a target feature is present in the received image. As an example, the weakly-supervised classification algorithm may determine whether a building is depicted in the received image. In response to determining that a target feature is present, the method further includes using a weakly-supervised segmentation algorithm of the convoluted neural network to segment the received image for the target feature. Based on a determined footprint size of the target feature, a distribution of statistical information over the target feature in the image can be calculated.

20 Claims, 6 Drawing Sheets

DETERMINATION OF POPULATION DENSITY USING CONVOLUTED NEURAL NETWORKS

TECHNICAL FIELD

This disclosure generally relates to systems and methods for a convoluted neural network.

BACKGROUND

Convolutional neural networks (CNNs) may be used in machine learning implementations in applications such as image and video recognition, or natural language processing. A CNN may typically comprise a number of layers of computational constructs called "neurons." Each neuron may receive as input a portion of the receptive field (e.g. the output of the previous layer), and output a value for a selected feature. A CNN may be trained based on a set of training data which provides inputs and correct outputs.

SUMMARY OF PARTICULAR EMBODIMENTS

In particular embodiments, a weakly-supervised classification algorithm may be used to determine the presence of a particular feature within an analyzed image. A weakly-supervised algorithm may be trained using image-level labels, such as whether the particular feature is present or not in a training image, without pixel-specific training data that would indicate where in an image the particular feature can be found.

In particular embodiments, one or more images to be analyzed may comprise satellite photos of a particular geographic region, and the target feature to be determined may be the presence of buildings in the images. An adaptive learnable transformer may be first used to reduce haze or noise in the original satellite image, and may also be used to convert a grayscale image into color. In particular embodiments, the adaptive learnable transformer is training using the output of the weakly-supervised classification algorithm before processing the image, and after performing processing. The weakly-supervised classification algorithm may then determine whether the target feature is present in the image being analyzed. In particular embodiments, this determination may be performed by generating a per-pixel probability that a pixel corresponds to the target feature, then generating an average of the per-pixel probabilities throughout the image. In particular embodiments, based on the average, the classification algorithm may determine whether the target feature is present. If the target feature is present, a suitable segmentation algorithm, such as a weakly-supervised segmentation algorithm (that is also trained using image-level training data) may determine the location and size of the target feature in each image. The footprint of the target feature for each image may be determined. In the example discussed above, the footprint may comprise the total area of the buildings that are present within the geographic region. By analyzing numerous images for a particular geographic region, the total population and population density of the geographic region, as well as the exact locations within the region where the population is concentrated, may be estimated.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, image segmentation techniques may be performed on a large set of images for a particular feature. As an example and not by way of limitation, a set of satellite images may be analyzed for the presence and size of houses or other structures depicted in the images. By determining a total footprint of buildings in the images (which would correlate with the buildings' areas), a population for the depicted area may be estimated. This may be particularly helpful in areas where detailed census data is not readily available. In particular embodiments, the population may correlate to building size based on a known population density for a particular region. Based on the analyzed satellite images, a computing device may update a total census for a particular region (e.g., how many total people live in that region), and/or provide population density estimates (e.g., which parts of that region the people tend to live in). In particular embodiments, this population density information may be used for infrastructure planning purposes.

In particular embodiments, a convoluted neural network (CNN) may be used with deep neural network learning to perform image segmentation. In particular embodiments, the image segmentation analysis may involve several steps that are performed in a cascade. In particular embodiments, a CNN utilizes a plurality of "neurons," where each individual neuron is trained to output a value with respect to a particular feature of an input. As an example and not by way of limitation, if the input data is an image, individual neurons of a CNN may be trained to output values based on: the amount of red coloration in the image; the total contrast in the image; an aspect ratio of the image; the presence of sharp edges in the image; or the presence of human-shaped objects in the image, respectively.

In particular embodiments, the CNN may first be trained using a set of training data. As an example and not by way of limitation, a CNN may be trained for the features the individual neurons are trained to detect using a set of example images, for which the output is already known. In particular embodiments, the CNN may impose a "cost" on neurons for outputs that vary from the known outputs, and each individual neuron may vary its output for given inputs in order to reduce its "costs." In particular embodiments, training the CNN may require very fine supervision to ensure that each neuron adjusts its outputs for the particular feature they are intended to analyze. In particular embodiments, this level of supervision may require object level bounding boxes or a pixel-level semantic label so that the neuron is able to determine which features for fine details in an image are to be analyzed. In particular embodiments, such a fine level of supervision may be very computationally- and time-intensive in order to generate a useful amount of training data and in training the neurons. In particular embodiments, a trained CNN may be able to outperform humans in pattern recognition for a large set of data.

In particular embodiments, finely-supervised training for an image semantic segmentation method may assign each pixel of an image a semantic label. In particular embodiments, image semantic segmentation algorithms may incorporate both a global information and a local information during inference. As an example and not by way of limitation, global information may be used to determine "what" labels should be associated with an image, and local information may provide "where" the labels should be in the image. However, as described above, image semantic segmentation methods for using a CNN that requires both global and local information may require a large amount of pixel-level finely-labeled training data.

In particular embodiments, a CNN may be trained in a weakly-supervised manner to perform image semantic segmentation or object localization. A weakly-supervised algorithm may differ from a finely-supervised CNN in that the training data for a weakly-supervised CNN may not include finely-labeled training samples. As an example and not by way of limitation, where a finely-labeled training sample may include, for a particular image, the values of a desired feature at a pixel-specific level, a weakly-supervised training sample may simply indicate for a particular image whether the desired feature is present. As an example and not by way of limitation, a weakly-supervised CNN may be trained to identify features corresponding to rooftops of human-made structures in a particular region. In this example, the general background color depicted in the satellite images may be green or gray corresponding to vegetation and rocks, while human-made buildings such as houses may be brown corresponding to wood. A weakly-supervised CNN may be trained with an initial set of samples that indicate whether a wooden structure is present among vegetation and/or rocks. From this input data, one or more neurons of the weakly-supervised CNN may be trained to detect brown regions of an image and identify it as a potential structure.

In particular embodiments, a weakly-supervised CNN algorithm may attempt to minimize a loss function given training data and supervision. As an example and not by way of limitation, given training data and supervision $\{x_i, y_i\}_{i=0}^L$, neural network may attempt to minimize the loss function $$f_w = \operatorname{argmin} \sum_i \frac{1}{2} \|y_i - f_w(x_i)\|^2 + \lambda \|w\|_2$$

where $f_w$ is the transformation from input x to output $\hat{y}$ parametered with w.

In particular embodiments, the weakly-supervised learning may use a feedback network. As an example and not by way of limitation, the following algorithm may be used for the weakly-supervised learning:

---

Input: Sample $\{x_i, y_i\}$, and neural network initialization $f_w$

1  Forward: Inferring estimation $\hat{y}_i = f_w(x_i)$;
2  Feedback: Estimating Neuron Activations $\theta$
3  for each layer l do
4     if $\dfrac{\partial \|y^l - fw(x^l)\|^2}{\partial x_i^l} \rightarrow \gamma$ then
5       Active neuron $x_i^l$: Set $\theta_i^l = 1$;
6     else
7       Suppress neuron $x_i^l$: Set $\theta_i^l = 0$;
8  end
9  Backward: Perform backpropagation and update parameter using SGD.

---

In particular embodiments, for a particular layer of neural network l, with input $x^l$ and target output $y^l$, the layer may be interpreted as a computational model, by optimizing the target function of:

$$\min \tfrac{1}{2}\|y^l - f_w(x^l)\|^2 + \gamma \|x^l\|_1$$

which may attempt to optimize the target output $f_w(x^l)$ and control the activations of neurons $x^l$.

In particular embodiments, the L2 regularization term $\|w\|_2$ may be omitted since it could be easily implemented using weight decay in Stochastic Gradient Descent.

In particular embodiments, this optimization may be solved by attempting to optimize two subproblems, $L_1$-Regularized least square problem and $L_2$ constrained least square problem:

If $\dfrac{\partial \|y^l - f_w(x^l)\|^2}{\partial x_i^l} > \gamma$ then $x_i^l$ may be positively activated;

If $\dfrac{\partial \|y^l - f_w(x^l)\|^2}{\partial x_i^l} < -\gamma$ then $x_i^l$ may be negatively activated;

Otherwise, neuron $x_i^l$ may be deactivated.

In particular embodiments, for the input $x^l$ of a particular layer l, the final estimation of neural network may be denoted as $$\hat{y} = f_w^l(x^l) \cong T^l x^l + O(x^2)$$

using first order Taylor Expansion. In particular embodiments, for a determined input, all nonlinear neurons in transformation $f_w^l$ may be deterministic, and $f_w^l$ may become a linear transformation related with input x. The linear transformation may be denoted as $T^l(x)$. Taking derivatives on both side may give $$\frac{\partial \hat{y}}{\partial x^l} = T^l(x)$$

and similarly $$\frac{\partial \|y - \hat{y}\|^2}{\partial x^l} \propto T^l(x)$$

As an example and not by way of limitation, the proposed algorithm may be explained thus: the optimization in feedback procedure may try to active those neurons $x_i$ with $T_i^l(x) > \gamma$, which may mean it has certain positive contribution to the final target; and may suppress those with negative contributions. It may also give a simple method during testing: in order to locate the object(s) related with target concept $y_i$, the gradient vector may be set as $\delta = y - \hat{y} = [0, 0, \ldots, 1, 0, \ldots]$, where only the i-th dimension $\partial_i$ may be non-zero; and the feedback procedure described above may be run to get corresponding neuron activations.

Figure 1:
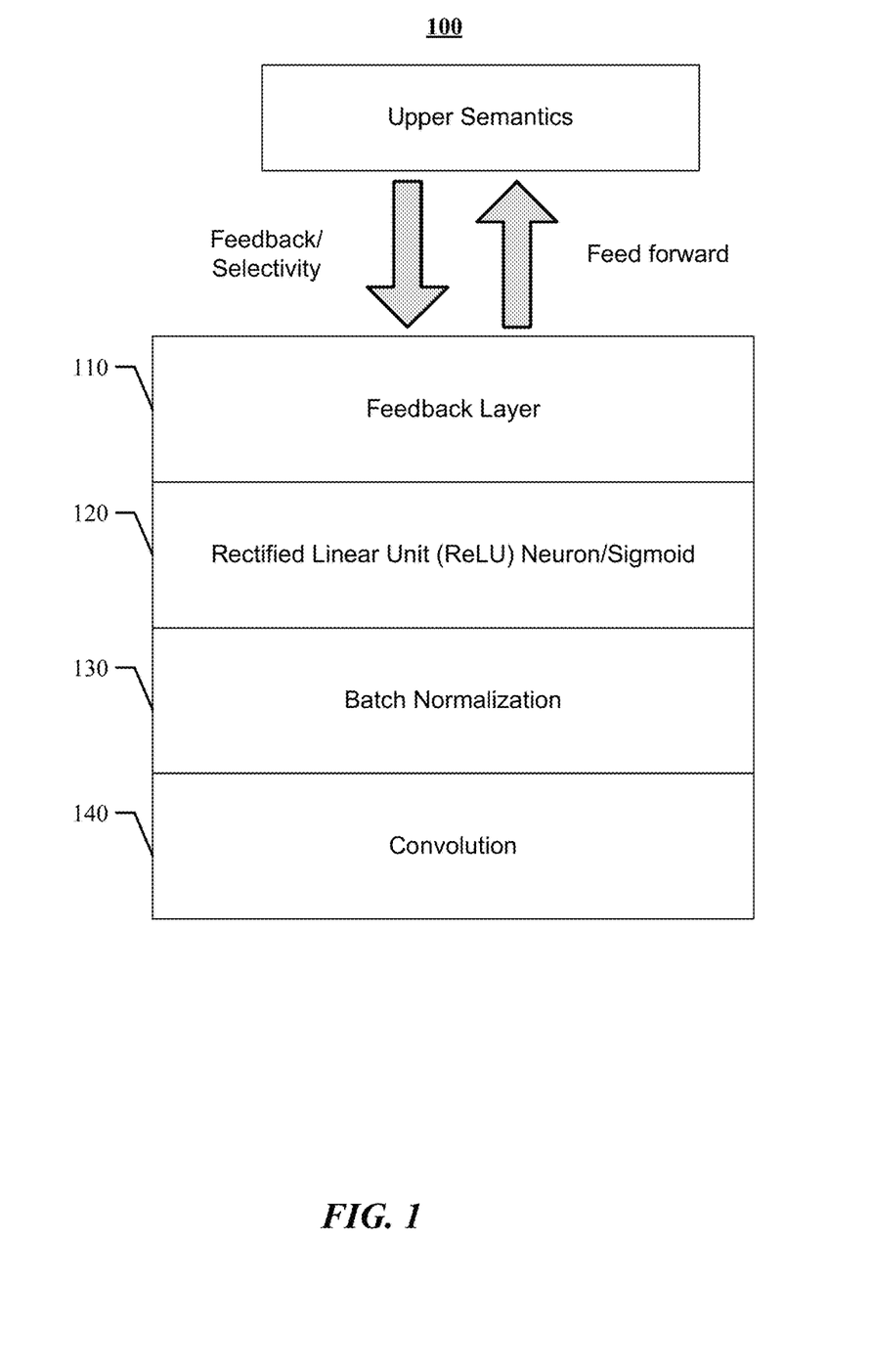
FIG. 1 illustrates an example feedback unit for a weakly-supervised convoluted neural network.

FIG. 1 depicts an example feedback unit 100 that may implement the image segmentation method described above. In particular embodiments, multiple feedback units 100 may be used in a CNN to perform the image segmentation. In the example of FIG. 1, each feedback unit 100 may be comprised of multiple layers: a feedback layer 110, a rectified linear unit (ReLU) layer 120, a batch normalization layer 130, and a convolution layer 140. In particular embodiments, a feedback layer 110 may behave similarly to a ReLU layer 120. In particular embodiments, a ReLU layer 120 may only allow neurons with positive outputs to be activated. In the example of a feedback layer 110, it may only allow neurons with positive gradients being activated. As an example and not by way of limitation, a feedback layer 110 may only permit neurons where $$\frac{\partial \|y - \hat{y}\|^2}{\partial x^l} > \gamma.$$

In particular embodiments, to improve the efficiency of the feedback layer 110, $\gamma$ may be set to 0. In this embodiment, the feedback layer 110 may be considered a "RevReLU layer" in analogy to the standard ReLU layer 120.

Figure 2:
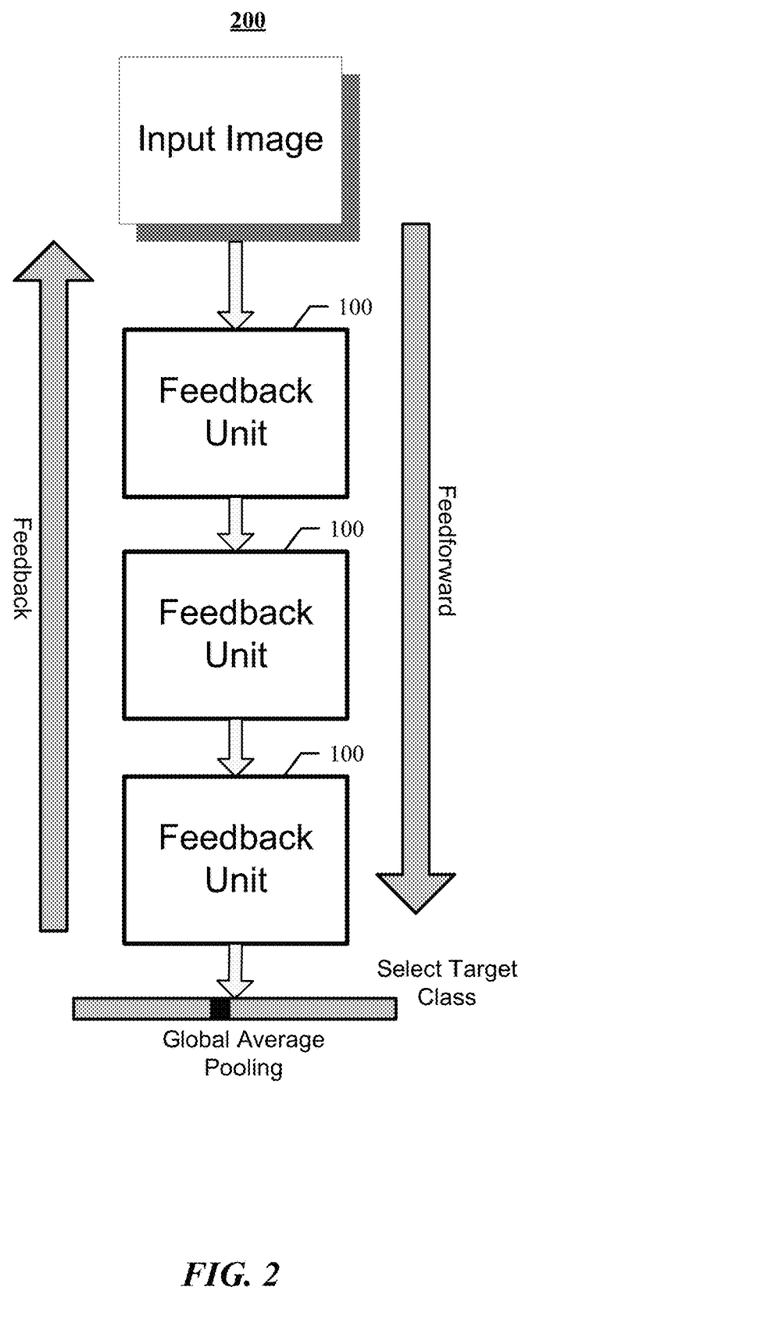
FIG. 2 illustrates an example weakly-supervised convoluted neural network using feedback units.

FIG. 2 depicts an example weakly-supervised network 200 that may be constructed using feedback units 100. The weakly-supervised network 200 may receive an input image, which is then processed through multiple feedback units 100. In particular embodiments, a number of channels in the last convolution layer 140 (e.g. of the last feedback unit 100) may equal the number of classes that are output by the weakly-supervised network 200. In particular embodiments, an output probability of the weakly-supervised network may be derived by applying global average pooling. In particular embodiments, the neuron activations of the last convolution layer 140 may be used as a heatmap to show the semantic segmentation probabilities of the image.

In particular embodiments, the image segmentation methods may first use an adaptive learnable transformer to performing a denoising, or dehazing, process on a received image. In particular embodiments, specific neurons of a CNN may be trained to detect and remove noise or haze introduced in the received image. In particular embodiments, an image may have noise introduced due to a need to increase contrast for a low-contrast image, or from increasing the brightness of an image for a low-light image. In particular embodiments, haze in an image may be introduced if the subject of the image is covered by haze. As an example and not by way of limitation, for satellite images, some images may depict regions that have haze or fog, which would render the satellite image as also hazy or foggy. In particular embodiments, high-level semantic information may be provided to guide the denoising process. In particular embodiments, the high-level semantic information may define particular properties of pixels that should be denoised. As an example and not by way of limitation, a denoising algorithm may not know where in the image a denoising process should be performed. The semantic information may direct the algorithm to denoise pixels corresponding to desired features (such as houses) without necessarily performing those algorithms on other pixels (such as those for trees). In particular embodiments, the adaptive learnable transformer may denoise only the relevant features.

In particular embodiments, an adaptive learnable transformer may be stacked with another identifier algorithm, such as a weakly-supervised classifier algorithm, which is discussed in further detail below. In particular embodiments, the second identifier algorithm may determine whether the original unprocessed image contains a relevant feature or not, and output a 1 if the feature is present, or a 0 if the feature is not present. After the denoising process is performed, the second identifier algorithm may be used to determine if in the processed image contains the relevant feature or not. In particular embodiments, if the output of the second identifier algorithm changes between the original image and a processed image, this may indicate a need to train the adaptive learnable transformer further. In particular embodiments, this feedback process may be used iteratively to further train the adaptive learnable transformer. In particular embodiments, the adaptive learnable transformer may be further used for other image processing methods. As an example and not by way of limitation, the adaptive learnable transformer may be used to convert images from grayscale to color, or vice versa.

In particular embodiments, an image segmentation technique may further execute a weakly-supervised CNN classification algorithm in order to determine whether a relevant feature is present in the image. As an example and not by way of limitation, the image segmentation technique may use a weakly-supervised classifier algorithm to determine whether the desired feature is present. In particular embodiments, the output of this algorithm is a 1 for the desired feature being present, or a 0 for the desired feature not being present. In particular embodiments, this algorithm may be weakly-supervised by providing the 1 or 0 as input data for the training set of data. In particular embodiments, the algorithm may determine whether a feature is present for the entire image, rather than determining whether the feature is present on a pixel-by-pixel level. In particular embodiments, this may improve computational efficiency, as the weakly-supervised CNN may not need to actually output probabilities at a pixel level. In particular embodiments, the weakly-supervised CNN may execute a weakly-supervised algorithm that may determine for each pixel a probability that the pixel corresponds to the desired feature. As an example and not by way of limitation, for a 64×64 pixel image, the weakly-supervised CNN may determine a separate probability for each of the pixels a 1 or 0 corresponding to whether a feature is present, then determine an average value for the image by taking the average per-pixel probabilities.

In particular embodiments, the weakly-supervised CNN may further use a weakly-supervised segmentation algorithm for determining the "footprint" of the feature, e.g. the size of the desired feature in the image, for images determined to have the desired feature. As an example and not by way of limitation, for a set of images determined to have the desired feature present, the segmentation algorithm may identify the pixel size of the features to calculate an area of the image on which the feature is present.

In particular embodiments, the weakly-supervised segmentation algorithm for a CNN may be trained using a set of training data that simply indicates whether a feature is present (1) or not present (0) for the entire image, rather than pixel-specific training data on whether a feature is present for a particular pixel. In particular embodiments, based on the input data provided, the weakly-supervised segmentation algorithm may determine the signals in the images with the desired feature that are not present in the images without the desired feature. Based on these determined signals, the weakly-supervised segmentation algorithm may then detect the signals on the images indicated by the CNN.

In particular embodiments, the image segmentation techniques discussed above may be used to determine a relative value for a set of images. As an example and not by way of limitation, satellite images depicting buildings may be analyzed to determine a population density. In this example, the weakly-supervised CNN may determine that for a particular geographic region that is depicted in 100 satellite images, there are 2000 area units in the images that are determined to be buildings. In this example, the 2000 area units may not be distributed evenly throughout the 100 satellite images. The weakly-supervised CNN may also receive input data indicating that this geographic region includes a population of 10,000 people. The weakly-supervised CNN may then determine that the general population density in this geographic region should be considered to be 10000 people per 2000 area units, or 5 people per area unit. Then, for each sub-region depicted in each of the 100 satellite images, the weakly-supervised CNN may calculate a population or population density for that particular region. Continuing this example, suppose that each individual satellite image depicts a 1 km$^2$ region. A particular satellite image may be determined to depict 200 area units corresponding to buildings, which corresponds to 1000 people. The weakly-supervised CNN may determine additional statistical information, including the facts that 10% of the region's population resides within that particular sub-region, and that this sub-region has a population density of 1000 persons/km$^2$, which is 10 times higher than the average for this region. In particular embodiments, the weakly-supervised CNN may generate "heatmaps" of population density or any other measured information that corresponds to the prevalence of the feature in each sub-region.

Figure 3:
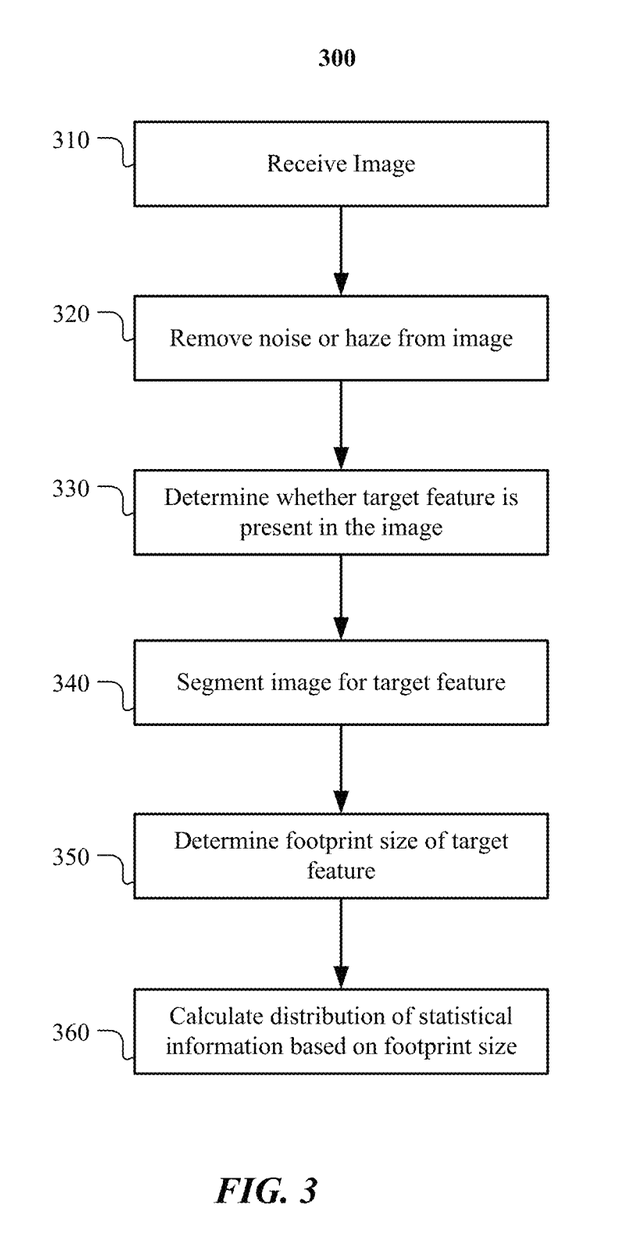
FIG. 3 illustrates an example method for determining the footprint size of a target feature in an image using a weakly-supervised convoluted neural network.

In particular embodiments, the population density and/or distribution heatmaps may be used to plan other services or material for the analyzed region. As an example and not by way of limitation, an entity wishing to set up infrastructure material such as Internet modems, cell towers, power stations, etc. may wish to know whether the population in a given area is evenly dispersed (so that the structures will also have to be evenly distributed throughout the region), or concentrated in a few sub-regions (so that the infrastructure structures and services can prioritize those sub-regions so that the services reach the greatest number of people). In particular embodiments, determining population density using image semantic segmentation methods may FIG. 3 illustrates an example method 300 for using a weakly-supervised network 200 to determine a statistical distribution of information across an image. The method may begin at step 310, where a computing system of a weakly-supervised CNN may receive an image. As an example and not by way of limitation, the image may depict a satellite photo that may or may not include depictions of buildings. At step 320, the weakly-supervised CNN may be used to remove noise or haze that is present in the image. At step 330, a classification algorithm of the weakly-supervised CNN may be used to determine whether a target feature is present in the image. As an example and not by way of limitation, the classification algorithm may determine that the receive image includes a building. At step 340, upon determining that the target feature is present in the image, the weakly-supervised CNN may perform a segmentation algorithm to segment the image for the desired feature. As an example and not by way of limitation, the weakly-supervised network may use the neuron activations of the last convolution layer of a series of feedback units to determine the areas of the image where the feature is present. At step 350, the computing system may determine a footprint size of the target feature in the image. In particular embodiments, this may be done simply by determining the total number of segmented pixels in the segmented image, compared to the total number of pixels in the received image. In particular embodiments, the footprint size may be adjusted based on other received images. As an example and not by way of limitation, if a first image is received with a 5× optical zoom and has 50 pixels with the target feature, and a second image is received at a 10× optical zoom with 100 pixels with the target feature, the computing system may compare the relative zoom levels of the two images and adjust the footprint sizes to compensate. As an example and not by way of limitation, because the first image must be doubled in size to become equivalent to the second image, the computing system may increase the footprint size by a factor of four (two squared), and determined that the first image at the same zoom level would have 200 pixels with the target feature. At step 360, the computing system may calculate a distribution of statistical information over the target feature in the image. In particular embodiments, the distribution may be based on multiple images. As an example and not by way of limitation, a series of 100 satellite images may depict a particular geographic region, with a total of 50 buildings scattered across the images. The weakly-supervised network may determine for this set of images that the 50 buildings are depicted in a particular subset of images. If the computing system has additional information that this region has 200 people, it may determine the population distribution of the 200 people in the region based on where the buildings are depicted and their relative size.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for using a weakly-supervised convoluted neural network to determine a statistical distribution of information across an image including the particular steps of the method of FIG. 3, this disclosure contemplates any suitable method for determining a statistical distribution of information across an image including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
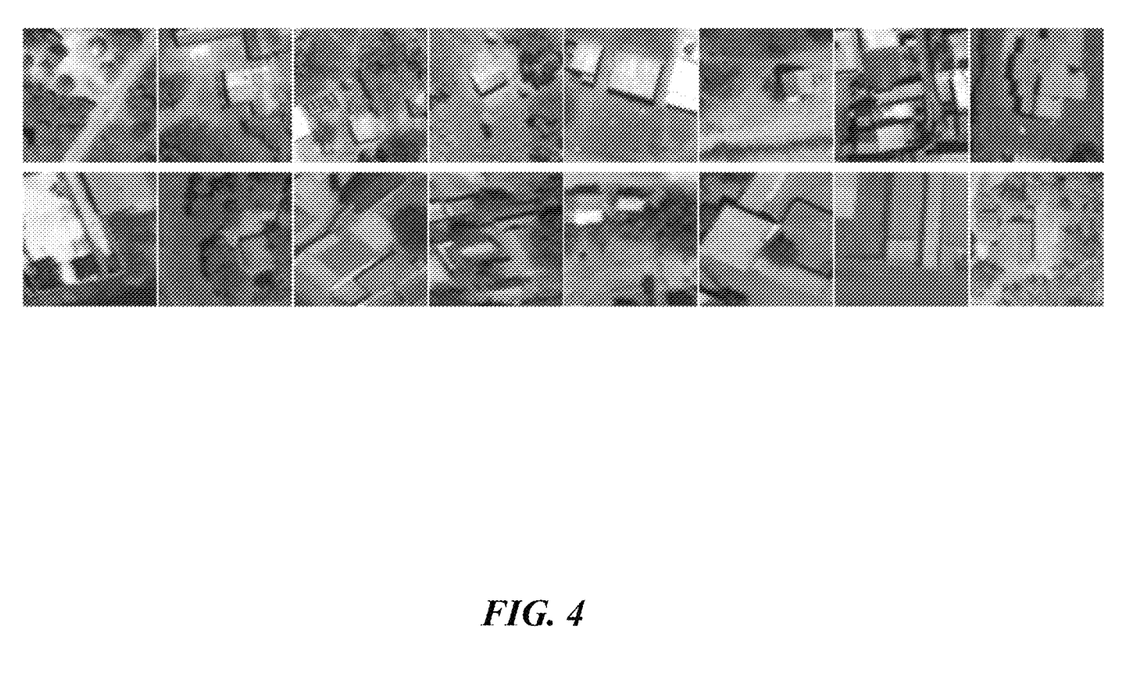
FIG. 4 illustrates example images that may be analyzed for target features using a weakly-supervised convoluted neural network.

FIG. 4 illustrates example of images that may be analyzed for target features using the weakly-supervised CNN, or used to train the weakly-supervised CNN. In the example of FIG. 4, each of the 16 depicted images may be a 64×64 pixel satellite image depicting a particular geographic region. In the example of FIG. 4, each of the images depicts at least one building which may be detected by the weakly-supervised CNN. In particular embodiments, each image in FIG. 4 may already be labeled with semantic information indicating that a building is present in the image. In particular embodiments, the weakly-supervised CNN may receive the images of FIG. 4 as part of a training set of data for detection and segmentation of target features such as buildings. In the example of FIG. 4, each of these images may be used for training with an image-level label of "1", indicating that the target feature is depicted.

Figure 5:
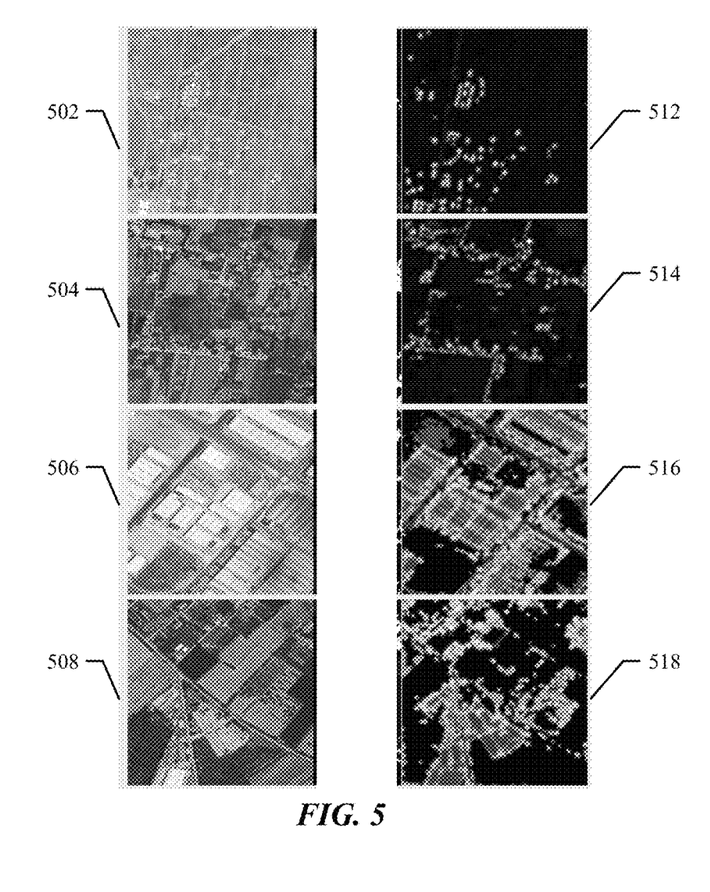
FIG. 5 illustrates example image segmentation results using a weakly-supervised convoluted neural network.

FIG. 5 illustrates an example of segmented images for a target feature using the weakly-supervised CNN. In particular embodiments, the weakly-supervised CNN may receive images 502, 504, 506, 508 in order to determine whether buildings are present in the images, and segment the images for buildings. In particular embodiments, the weakly-supervised CNN may first perform dehazing or denoising on images 502, 504, 506, and 508 to reduce any haze or noise that may be present in each image and interfere with feature classification and segmentation. In particular embodiments, the weakly-supervised CNN may then execute a classification algorithm as discussed above to determine whether the target feature (e.g. buildings) is present in each of the images. In the example of FIG. 5, each image 502, 504, 506, and 508 depicts at least one building. For images determined to have the target feature, the weakly-supervised CNN may then execute a segmentation algorithm as depicted above to determine the placement and size of the target feature. In particular embodiments, the last convolution layer of the last neuron in the weakly-supervised CNN may correspond to a "heatmap" depicting the location of the target feature in each image. The segmentation heatmaps may be displayed as images 512, 514, 516, and 518, corresponding to images 502, 504, 506, and 508, respectively. In particular embodiments, the weakly-supervised CNN or any other appropriate computing system may determine a footprint size of the segmented target feature in each image 512, 514, 516, and 518, and determine a distribution of statistical information across one or more of the images. As an example and not by way of limitation, if it is determined that images 502, 504, 506, and 508 represent four quadrants of a single geographic region that is known to contain 500 fire extinguishers, analysis of the segmented images 512, 514, 516, and 518, where images 516 and 518 depict proportionally more buildings than images 512 and 514, may determine that there are proportionally more fire extinguishers in the regions depicted in images 506 and 508, compared to the regions depicted in 502 and 504. A quantitative analysis may be performed to quantify the relative distribution based on the relative footprints of buildings in each region.

Systems and Methods

Figure 6:
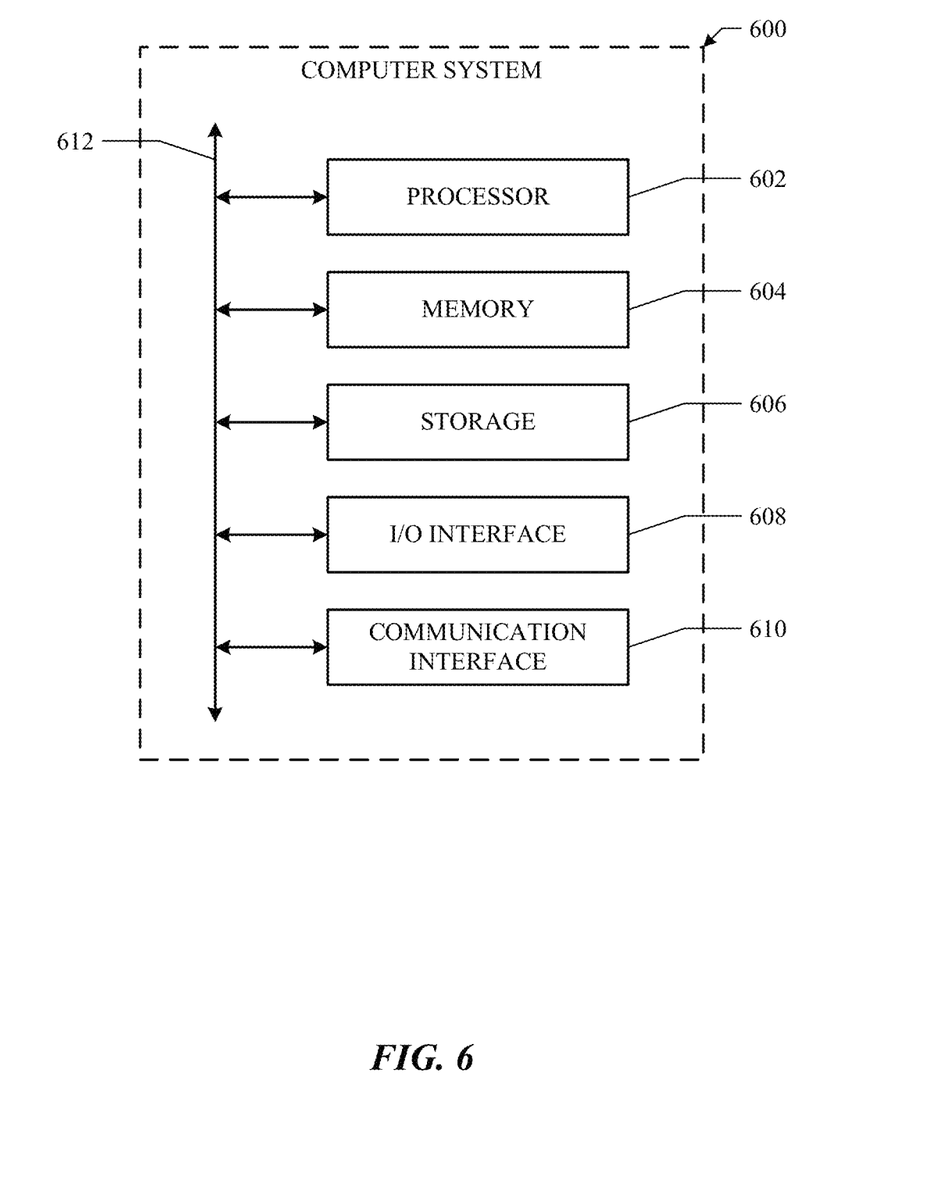
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes and illustrates particular embodiments as providing particular advantages, particular embodiments may provide none, some, or all of these advantages.

What is claimed is:

1. A method comprising:
    receiving an image;
    executing a weakly-supervised classification algorithm to determine whether a target feature is present in the received image;
    in response to determining that a target feature is present, using a weakly-supervised segmentation algorithm of the convoluted neural network to segment the received image for the target feature and determine a footprint size of the target feature; and
    calculating a distribution of statistical information over the target feature based on the determined footprint size of the target feature.

2. The method of claim 1, wherein calculating the distribution of statistical information is based at least in part on a property that scales with the size of the target feature within an image.

3. The method of claim 1, wherein using the convoluted neural network to remove noise or haze comprises using an adaptive learnable transformer, wherein the adaptive learnable transformer is trained to remove noise or haze from pixels corresponding to the target feature.

4. The method of claim 3, wherein training the adaptive learnable transformer is based on image-level labeled data and the weakly-supervised classification algorithm.

5. The method of claim 1, wherein the weakly-supervised classification algorithm is trained using image-level labeled data, without pixel-level labeled data.

6. The method of claim 1, wherein determining whether a target feature is present in the received image comprises:
    for each pixel in the received image, determining, using the weakly-supervised classification algorithm, a per-pixel probability that the pixel corresponds to the target feature; and
    determining an average of the per-pixel probabilities for the pixels in the received image.

7. The method of claim 1, wherein the weakly-supervised classification algorithm further comprises a feedback loop to suppress irrelevant neuron activations of the convoluted neural network.

8. The method of claim 1, wherein the weakly-supervised segmentation algorithm is trained using image-level labeled data, without pixel-level labeled data.

9. The method of claim 1, wherein the weakly-supervised segmentation algorithm is trained to minimize a loss function $$f_w = \mathrm{argmin} \sum_i \frac{1}{2} \|y_i - f_w(x_i)\|^2 + \lambda \|w\|_2$$

wherein $f_w$ is the transformation from input x to output $\hat{y}$ parametered with w.

10. The method of claim 1, wherein the convoluted neural network comprises a plurality of layers.

11. The method of claim 10, wherein each layer comprises a plurality of neurons.

12. The method of claim 11, wherein for a particular layer 1 with input $x^1$ and target output $y^1$, the convoluted neural network optimizes a target function min $\frac{1}{2}\|y^l - f_w(x^l)\|^2 + \gamma \|x^l\|1$, wherein:
    $f_w$ is the transformation from input x to output $\hat{y}$ parametered with w; and
    for a particular neuron $n_i^l$:

if $\frac{\partial \|y^l - f_w(x^l)\|^2}{\partial x_i^l} > \gamma$ then $x_i^l$ may be positively activated;

if $\frac{\partial \|y^l - f_w(x^l)\|^2}{\partial x_i^l} < -\gamma$ then $x_i^l$ may be negatively activated;

else, neuron $x_i^l$ is deactivated.

13. The method of claim 10, wherein the convoluted neural network comprises one or more stacks, wherein each stack comprises a feedback unit comprising one or more layers.

14. The method of claim 13, wherein each feedback unit allows neurons with positive gradients to be activated.

15. The method of claim 13, wherein the one or more layers comprise:
a feedback layer;
a rectified linear unit layer;
a batch normalization layer; and
a convolution layer.

16. The method of claim 15, wherein the feedback layer allows neurons with a positive gradient $$\frac{\partial \|y - \hat{y}\|^2}{\partial x^l} > \gamma$$

to be activated.

17. The method of claim 16, wherein $\gamma=0$.

18. The method of claim 1, wherein the weakly-supervised classification algorithm and the weakly-supervised segmentation algorithm are trained using a feedback network following the algorithm:

| Input: Sample $\{x_i, y_i\}$, and neural network initialization $f_w$ |
|---|
| 1  Forward: Inferring estimation $\hat{y}_i = f_w(x_i)$; |
| 2  Feedback: Estimating Neuron Activations $\theta$ |
| 3  for each layer l do |
| 4    if $\frac{\partial \|y^l - fw(x^l)\|^2}{\partial x_{\overline{1}}^1} -> \gamma$ then |

| -continued |
|---|
| Input: Sample $\{x_i, y_i\}$, and neural network initialization $f_w$ |
| 5    Active neuron $x_i^l$: Set $\theta_i^l = 1$; |
| 6    else |
| 7    Suppress neuron $x_i^l$: Set $\theta_i^l = 0$; |
| 8  end |
| 9  Backward: Perform backpropagation and update parameter using SGD. |

19. One or more computer-readable non-transitory storage media embodying software that is operable when executed to:
receive an image;
execute a weakly-supervised classification algorithm to determine whether a target feature is present in the received image;
in response to determining that a target feature is present, use a weakly-supervised segmentation algorithm of the convoluted neural network to segment the received image for the target feature and determine a footprint size of the target feature; and
calculate a distribution of statistical information over the target feature based on the determined footprint size of the target feature.

20. A system comprising: one or more processors; and a memory coupled to the processors comprising instructions executable by the processors, the processors being operable when executing the instructions to:
receive an image;
execute a weakly-supervised classification algorithm to determine whether a target feature is present in the received image;
in response to determining that a target feature is present, use a weakly-supervised segmentation algorithm of the convoluted neural network to segment the received image for the target feature and determine a footprint size of the target feature; and
calculate a distribution of statistical information over the target feature based on the determined footprint size of the target feature.

* * * * *